(12) United States Patent
Ichihara et al.

(10) Patent No.: US 8,905,223 B2
(45) Date of Patent: Dec. 9, 2014

(54) CONVEYING APPARATUS

(75) Inventors: Yuichi Ichihara, Shinagawa-ku (JP); Bungo Matsumoto, Shinagawa-ku (JP)

(73) Assignee: Hirata Corporation, Shinagawa-Ku, Tokyo (JP)

( * ) Notice: Subject to any disclaimer, the term of this patent is extended or adjusted under 35 U.S.C. 154(b) by 0 days.

(21) Appl. No.: 13/565,485

(22) Filed: Aug. 2, 2012

(65) Prior Publication Data

US 2013/0037385 A1 Feb. 14, 2013

(30) Foreign Application Priority Data

Aug. 11, 2011 (JP) .................................. 2011-176311

(51) Int. Cl.
*B65G 35/06* (2006.01)
*B65G 21/20* (2006.01)

(52) U.S. Cl.
CPC ............... *B65G 35/06* (2013.01); *B65G 21/20* (2013.01)
USPC ................... 198/465.2; 198/465.1; 198/346.3

(58) Field of Classification Search
CPC ............................... B65G 35/06; B65G 21/20
USPC ............................. 198/465.1, 465.2
See application file for complete search history.

(56) References Cited

U.S. PATENT DOCUMENTS

| | | | | |
|---|---|---|---|---|
| 3,708,051 A | * | 1/1973 | Dato et al. | 198/345.3 |
| 3,844,428 A | * | 10/1974 | Olsen | 414/280 |
| 3,998,316 A | * | 12/1976 | Kamm | 198/346.1 |
| 5,207,314 A | * | 5/1993 | Ueda et al. | 198/800 |
| 5,676,061 A | * | 10/1997 | Loomer | 105/141 |
| 5,960,938 A | * | 10/1999 | Clopton | 198/867.13 |
| 6,435,330 B1 | * | 8/2002 | Bonora et al. | 198/346.3 |
| 6,637,342 B1 | * | 10/2003 | Jennings et al. | 104/172.3 |
| 6,749,055 B2 | * | 6/2004 | Takano et al. | 198/465.2 |
| 7,014,033 B2 | * | 3/2006 | Sticht et al. | 198/465.1 |
| 7,565,966 B2 | * | 7/2009 | Yoshitani | 198/801 |
| 7,648,018 B2 | * | 1/2010 | Inui | 198/463.3 |
| 8,382,417 B2 | | 2/2013 | Yoshida et al. | |
| 8,425,173 B2 | * | 4/2013 | Lert et al. | 414/280 |
| 2011/0036686 A1 | | 2/2011 | Iwamoto | |

FOREIGN PATENT DOCUMENTS

| | | |
|---|---|---|
| CN | 1189435 A | 8/1998 |
| CN | 101181957 A | 5/2008 |
| CN | 102006969 A | 4/2011 |
| JP | 4147128 B2 | 9/2004 |
| JP | 2005-178936 A | 7/2005 |
| WO | WO 2009/128128 A1 | 10/2009 |

OTHER PUBLICATIONS

Chinese Office Action dated Jun. 13, 2014 issued in the corresponding Chinese Patent Application No. 201210285364.X (6 pages).

* cited by examiner

*Primary Examiner* — Gene Crawford
*Assistant Examiner* — Thomas Randazzo
(74) *Attorney, Agent, or Firm* — Buchanan Ingersoll & Rooney PC

(57) ABSTRACT

This invention provides a conveying apparatus which conveys a workpiece. The conveying apparatus includes a pallet which supports the workpiece, a conveyor which supports one side of the pallet in a direction perpendicular to a conveyance direction from below the pallet, and includes a conveyance roller for conveying the pallet and a driving source for driving the conveyance roller, and a heaving suppression guide member which extends along the conveyor, abuts against the other side of the pallet in the direction perpendicular to the conveyance direction, and suppresses heaving of the pallet.

8 Claims, 8 Drawing Sheets

CONVEYING APPARATUS

BACKGROUND OF THE INVENTION

1. Field of the Invention

The present invention relates to a conveying apparatus which conveys a workpiece.

2. Description of the Related Art

In some cases, a workman works on a workpiece conveyed by a conveying apparatus not only on a surface of the workpiece he faces, but also on leading and trailing surfaces in the conveyance direction. In this case, the working efficiency improves if working spaces are provided in front of and behind the workpiece. This method is effective especially in an assembly process for a large-size product such as an automobile or engine, because the workman cannot reach the leading and trailing surfaces of a workpiece if a conveyor exists below the workpiece.

Hence, for example, the automobile assembly process often adopts a system of suspending a workpiece from above and conveying it. However, this system requires large-scale equipment to prevent rolling off a workpiece and so on. Further, the conveyor is arranged above a workpiece, and maintenance requires work at a high position.

A conceivable effective measure is a cantilever conveying apparatus which supports a workpiece in the horizontal direction (side surface of the workpiece) perpendicular to the conveyance direction. Examples of the cantilever conveying apparatus are disclosed in Japanese Patent Laid-Open No. 2005-178936 and International Publication No. 2009/128128.

A conveying apparatus disclosed in Japanese Patent Laid-Open No. 2005-178936 holds a workpiece by pinching both upper and lower guiderails by upper and lower rollers arranged on the side of a holding mount. A conveying apparatus disclosed in International Publication No. 2009/128128 holds a workpiece by pinching a guiderail from below and above by upper and lower rollers of a holding mount.

However, when a workpiece is large and heavy, each of the above-mentioned conveying apparatuses requires large-scale equipment to ensure strength. Particularly in the above-mentioned conveying apparatus, the distance between the guiderails needs to be increased vertically to widen the interval between support points. As described above, maintenance is accompanied by work at a high position.

SUMMARY OF THE INVENTION

It is an object of the present invention to provide a conveying apparatus capable of cantilever support with a simple structure.

According to an aspect of the present invention, there is provided a conveying apparatus which conveys a workpiece, the apparatus comprising: a pallet which supports the workpiece; a conveyor which supports one side of the pallet in a direction perpendicular to a conveyance direction from below the pallet, and includes a conveyance roller for conveying the pallet and a driving source for driving the conveyance roller; and a heaving suppression guide member which extends along the conveyor, abuts against the other side of the pallet in the direction perpendicular to the conveyance direction, and suppresses heaving of the pallet.

According to another aspect of the present invention, there is provided a conveying apparatus which conveys a pallet that supports a workpiece, the apparatus comprising: a conveyor which supports one side of the pallet in a direction perpendicular to a conveyance direction from below the pallet, and includes a conveyance roller for conveying the pallet and a driving source for driving the conveyance roller; and a heaving suppression guide member which extends along the conveyor, abuts against the other side of the pallet in the direction perpendicular to the conveyance direction, and suppresses heaving of the pallet.

Further features of the present invention will become apparent from the following description of exemplary embodiments (with reference to the attached drawings).

DESCRIPTION OF THE EMBODIMENTS

Preferred embodiments of the present invention will now be described with reference to FIGS. 1, 2A, 2B, 3, 4A, 4B, 5A, and 5B. FIGS. 1, 2A, 2B, 3, 4A, 4B, 5A, and 5B are schematic views. In these drawings, the x-axis is the conveyance direction, the y-axis is the right-to-left direction (horizontal direction perpendicular to the conveyance direction) when viewed in the conveyance direction, and the z-axis is the vertical direction.

First Embodiment

<Overall Arrangement>

Figure 1:
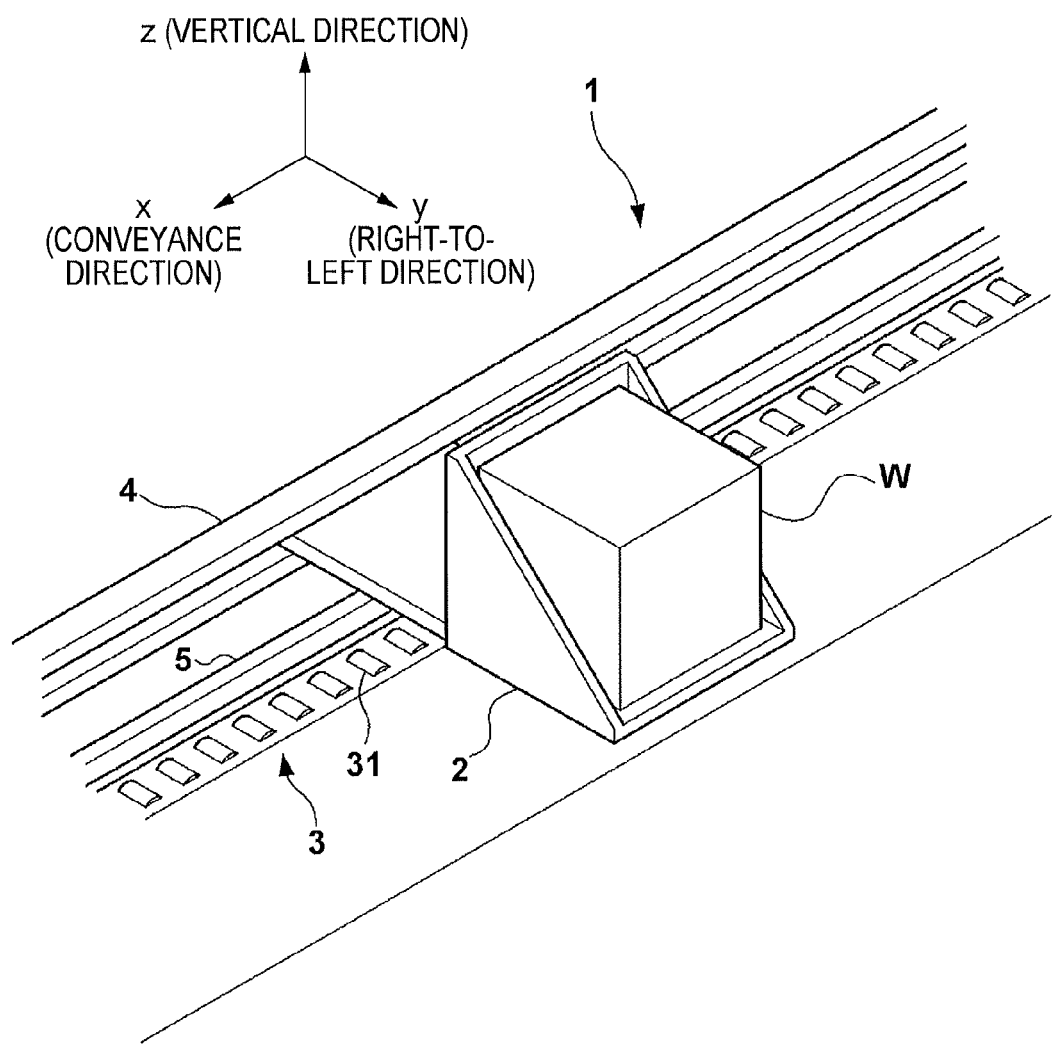
FIG. 1 is a perspective view showing a conveying apparatus according to the first embodiment of the present invention.

FIG. 1 is a perspective view showing a conveying apparatus 1 according to the first embodiment of the present invention. The conveying apparatus 1 includes a pallet 2 which supports a workpiece W, a conveyor 3 for conveying the pallet 2, a heaving suppression guide member 4 which extends along the conveyor 3 and suppresses heaving of the pallet 2, and a horizontal guiderail 5 which extends along the conveyor 3 between the conveyor 3 and the heaving suppression guide member 4.

<Pallet Structure>

Figure 2A:
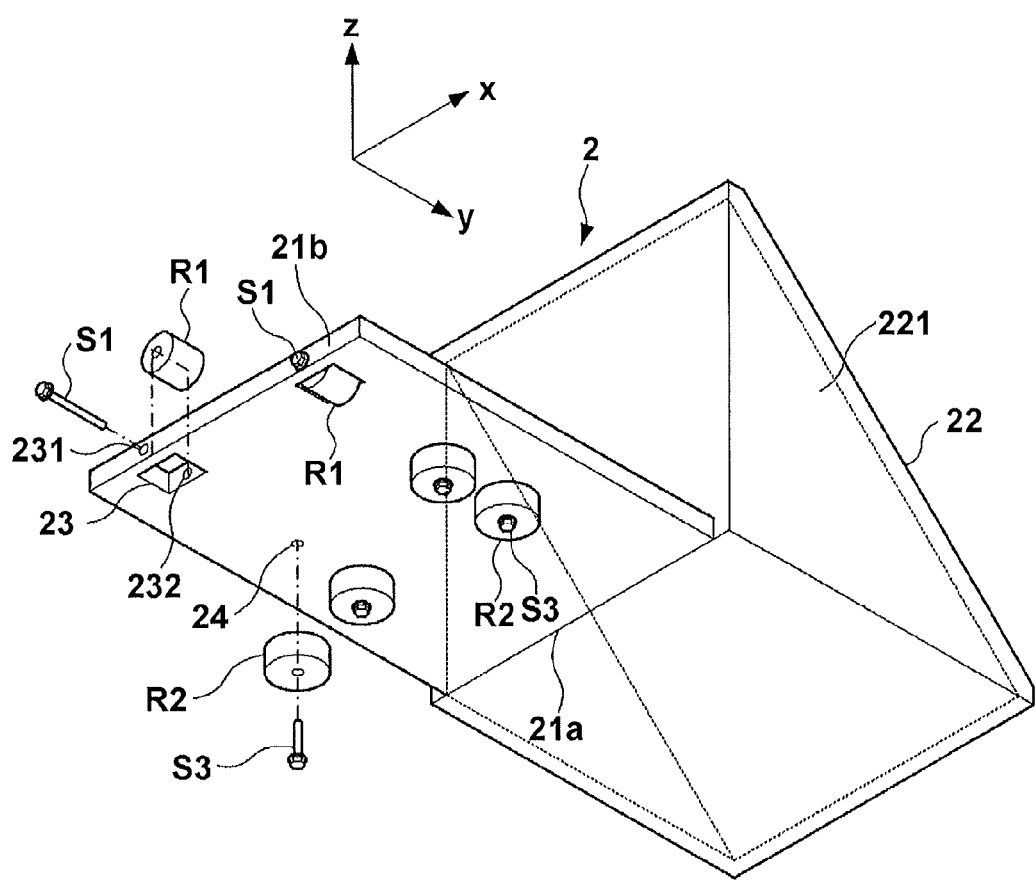
FIG. 2A is a view for explaining a pallet in FIG. 1.

The structure of the pallet 2 will be explained with reference to FIG. 2A. FIG. 2A is a perspective view showing the overall pallet when viewed from below. The pallet 2 includes a horizontal (x-y plane) plate-like main body member 21, and a support member 22 which is attached to one end of the main body member 21 on the left side (y direction) in the conveyance direction and supports the workpiece W.

As shown in FIG. 2A, columnar guided rollers R1 configured to abut against the heaving suppression guide member 4 are attached to the main body member 21 at two portions near an end 21b on a side (right side in the conveyance direction) opposite to a portion 21a where the support member 22 is attached. The main body member 21 includes through holes 23 in the vertical direction (z direction) to attach the guided rollers R1. Each guided roller R1 is set in the through hole 23 so that the rotating shaft of the guided roller R1 coincides with the right-to-left direction (y direction) with respect to the conveyance direction. In this state, each shaft member S1 having an external thread at the distal end portion is inserted from the end 21b of the pallet 2 on the right side in the conveyance direction into a through hole 231 and a through hole formed on the shaft center of the guided roller R1. The external thread is screwed with an internal thread 232 formed in the pallet 2. In the embodiment, the conveyance direction of the pallet 2 is a positive direction along the x-axis, so the shape member S1 is a right-hand thread. When the conveyance direction is reverse, a left-hand thread is desirable to prevent loosening of the screw. In the embodiment, the guided rollers R1 are arranged at two positions spaced apart in the conveyance direction. However, the guided rollers R1 may be arranged at one position or three or more positions.

Figure 2B:
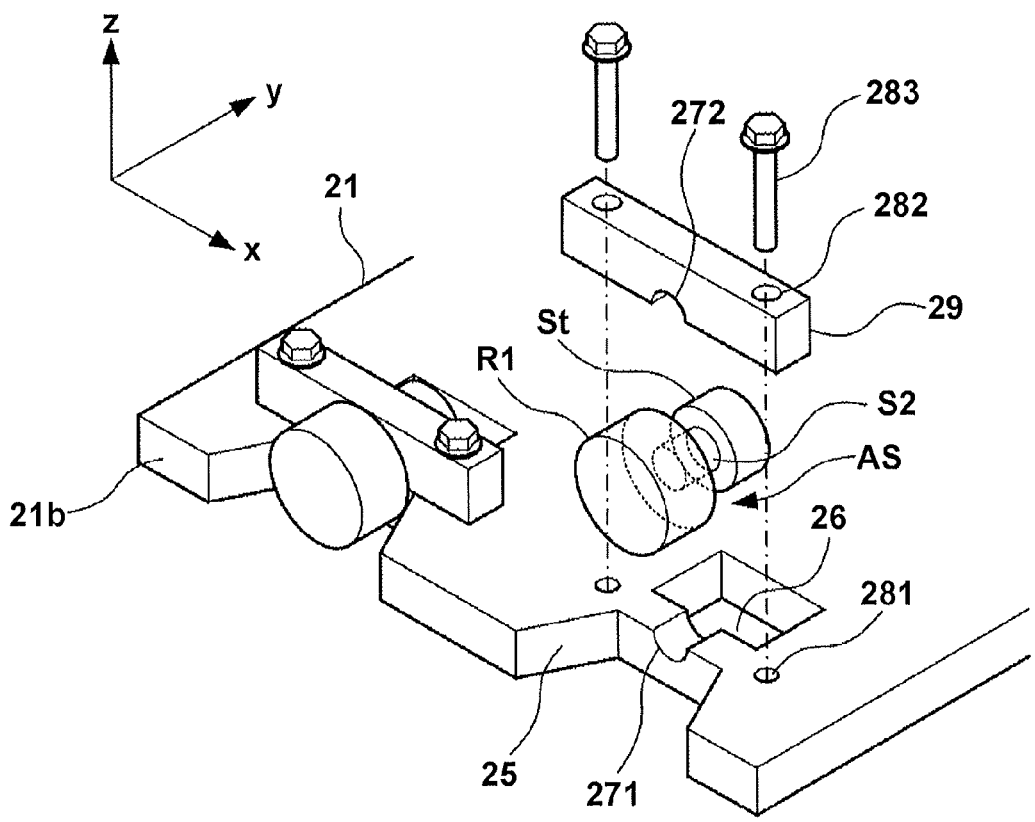
FIG. 2B is a view for explaining a modification of the pallet in FIG. 1.

In addition to this structure, the structure of the attaching portion of the guided roller R1 may be a structure as shown in FIG. 2B. FIG. 2B is a perspective view showing the roller attaching portion of the pallet 2 as a modification of FIG. 2A when viewed from above the pallet 2. The end 21b of the main body member 21 is notched to form roller storage portions 25. A through hole 26 is formed for each roller storage portion 25 on the left side (y direction) in the conveyance direction to extend through the main body member 21 in the vertical direction (z direction). The upper surface of the main body member 21 between the roller storage portion 25 and the through hole 26 is notched into a semi-cylindrical shape in the y direction, forming a lower shaft support 271. Internal threads 281 are formed downward from the upper surface of the main body member 21 on the two, right and left sides (leading and trailing sides in the conveyance direction) of the lower shaft support 271 to attach a roller fixing member (to be described later).

Each guided roller R1 is assembled into a guided roller assembly AS. The guided roller assembly AS includes a shaft S2 having an axis in the y direction, a cylindrical guided roller R1 which is attached to one end of the shaft S2 on the left side in the conveyance direction and is coaxial with the shaft S2, and a cylindrical stopper St which is attached to the other end (in the y direction) and is coaxial with the shaft. The guided roller assembly AS is set in the main body member 21 so that he shaft S2 abuts against the lower shaft support 271 of the main body member 21, the guided roller R1 is positioned in the roller storage portion 25, and the stopper St is positioned in the through hole 26.

In the structure shown in FIG. 2B, the roller R1 can be arranged on the right side in the conveyance direction with respect to the end 21b of the pallet 2. This structure can downsize the pallet 2 and heaving suppression guide member 4.

While the guided roller assembly AS is set in the main body member 21, a roller fixing member 29 is attached to fix the guided roller assembly AS. The roller fixing member 29 includes an upper shaft support 272 formed by notching the lower surface into a semi-cylindrical shape in the y direction. The upper shaft support 272 abuts against the set shaft S2. Further, the roller fixing member 29 includes two through holes 282 which become coaxial with corresponding internal threads 281 of the main body member 21 in a state in which the upper shaft support 272 abuts against the set shaft S2. In this state, bolts 283 are inserted into the roller fixing member 29 from above, extend through the respective through holes 282, and fitted into the internal threads 281 of the main body member 21, thereby fixing the guided roller assembly AS and attaching the guided roller R1.

Attachment of horizontal guided rollers R2 will be described by referring to FIG. 2A again. The horizontal guided rollers R2 are attached to the main body member 21 at positions where they pinch the horizontal guiderail 5 from its two side surfaces. For this purpose, internally threaded holes 24 are formed in the main body member 21 vertically from the lower surface at positions each serving as the rotation axis of the horizontal guided roller R2. While the horizontal guided roller R2 is set at a predetermined position, a shaft member S3 having an external thread at the distal end portion is inserted into a through hole formed in the horizontal guided roller R2, and screwed with the internally threaded hole 24. In this state, the head of the shaft member S3 prevents a drop of the horizontal guided roller R2. Another horizontal guided roller R2 is arranged at a position where the horizontal guided rollers R2 pinch the horizontal guiderail 5. The horizontal guided rollers R2 are used in pairs. In the embodiment, the conveyance direction is a positive direction along the x-axis. To prevent loosening of the shaft member S3, the horizontal guided roller R2 on the right side in the conveyance direction (on the side of the guided roller R1) out of the paired horizontal guided rollers R2 has a right-hand thread, and the horizontal guided roller. R2 on the left side in the conveyance direction (on the side of the workpiece W: right side in FIG. 2A) has a left-hand thread. In the embodiment, two pairs of horizontal guided rollers R2 are arranged at an interval in the conveyance direction. However, one pair or three or more pairs of horizontal guided rollers R2 may be arranged. Alternatively, a stud having an external thread at the distal end portion may be arranged on the main body member 21, and screwed with a nut or the like in a state in which the horizontal guided roller R2 is fitted on the stud.

The support member 22 includes a recess 221 for placing the workpiece W. The recess 221 is arranged on the left side in the conveyance direction (far right side in FIG. 2A) with respect to the main body member 21. In the embodiment, the pallet 2 cantilevers and supports the workpiece W via the support member 22. Since the workpiece W can be supported at one position, the pallet 2 and conveying apparatus 1 can be downsized.

Note that the support member 22 may be integrated with the main body member 21. As for the method of fixing the workpiece W, the support member 22 may include a projection (recess) which engages with a recess (projection) formed in the workpiece W, or the workpiece W may be fixed by fastening, unlike the embodiment.

<Conveyor Structure>

As shown in FIG. 1, in the embodiment, the conveyor 3 is a roller conveyor line including a plurality of conveyance rollers 31 which are arranged at equal intervals in the conveyance direction. The interval between the conveyance rollers 31 is smaller than ½ of the length of the pallet 2 in the conveyance direction. The pallet 2 is conveyed to contact at least two conveyance rollers 31. Even if one of the conveyance rollers 31 breaks, the pallet 2 can be conveyed as long as the conveyance roller 31 adjacent to the broken conveyance roller 31 can be driven. Since each conveyance roller 31 is replaceable, maintenance is easy.

Figure 3:
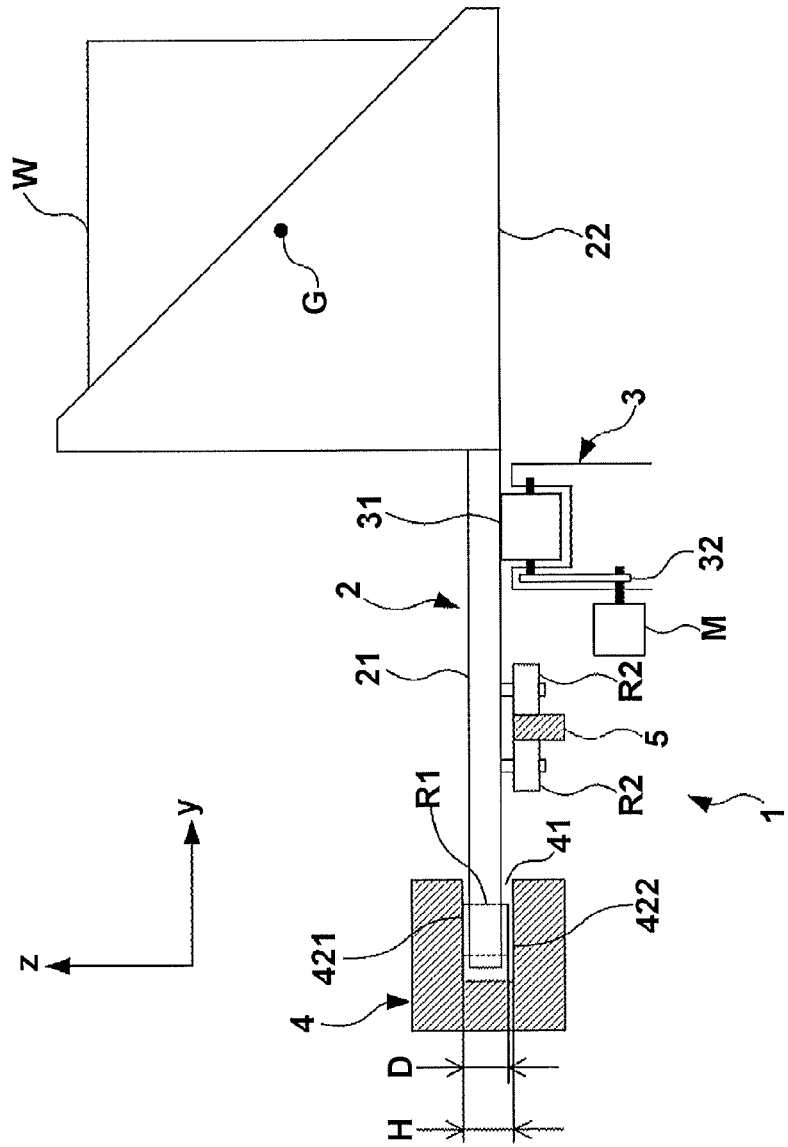
FIG. 3 is a view for explaining the conveying apparatus according to the first embodiment of the present invention when viewed in the conveyance direction.

Next, FIG. 3 will be referred to. FIG. 3 is a view for explaining the conveying apparatus according to the first embodiment of the present invention when viewed in the conveyance direction. The conveyor 3 includes the conveyance roller 31 which supports one side (left side in the conveyance direction (right side in FIG. 3) in the embodiment) of the pallet 2 in the y direction perpendicular to the x conveyance direction from below the pallet 2 and conveys the pallet 2, and a motor M serving as a driving source for driving the conveyance rollers 31. More specifically, a pulley 32 is wound around the shafts of the motor M and conveyance roller 31, and the motor M drives the conveyance roller 31 via the pulley 32. In the embodiment, one motor M drives the plurality of conveyance rollers 31, which form one unit, and a plurality of such units are arranged. For example, when each motor M drives five conveyance rollers 31, and there are 10 units described above, there are 50 conveyance rollers 31. Note that the number of conveyance rollers 31 may differ between the respective units. One motor M may drive one conveyance roller 31, the driving source may be an engine or the like other than the motor, and the conveyance roller 31 may be driven not via the pulley but via a gear.

In the embodiment, therefore, the speed of each unit can be adjusted, and the speed of each unit can be controlled to change depending on a section (unit) while properly keeping the interval between pallets.

<Structure of Heaving Suppression Guide Member>

The heaving suppression guide member 4 extends along the conveyor 3, and abuts against the other side (right side in the conveyance direction (left side in FIG. 3) in the embodiment) of the pallet 2 in the y direction perpendicular to the x conveyance direction, thereby suppressing heaving of the pallet 2. As shown in FIG. 3, in the embodiment, the heaving suppression guide member 4 is a rail having a groove 41, and includes an upper guide 421 and lower guide 422 which abut against the guided rollers R1. Part of the pallet 2 that includes the guided rollers R1 is horizontally inserted into the groove 41 of the heaving suppression guide member 4. More specifically, part of the pallet 2 that includes the guided rollers R1 is horizontally inserted into the groove 41 of the heaving suppression guide member 4. The top of the guided roller R1 faces (abuts against) the upper guide 421, and its bottom faces (abuts against) the lower guide 422. As is apparent from FIG. 3, the width H of the groove 41 is larger than the diameter D of the guided roller R1 in the embodiment. Hence, the guided roller R1 does not abut against both the upper guide 421 and lower guide 422 at the same time.

In the relationship of the heaving suppression guide member 4 with the pallet 2 and conveyor 3, G in FIG. 3 is the center of gravity of a conveyance member formed from the workpiece W and pallet 2. The center of gravity G exists outside (right side in FIG. 3) the pallet 2 on one side with respect to the position of the conveyor 3 when viewed two-dimensionally (front view from the downstream side in the conveyance direction in FIG. 3). A fall of the conveyance member can be prevented by making the pallet 2 abut against the upper guide 421.

The weight of the conveyance member formed from the workpiece W and pallet 2, and the force of pressing down the pallet 2 by the heaving suppression guide member 4 are applied to the conveyor 3. By making best use of the friction between the conveyance roller 31 of the conveyor 3 and the pallet 2, the conveyor 3 can drive the pallet 2.

In the embodiment, when the workpiece W is mounted, the guided roller R1 abuts against the upper guide 421 of the heaving suppression guide member 4, as shown in FIG. 3. Although not shown, when the workpiece W is not mounted and the center of gravity of the pallet 2 exists between the conveyor 3 and the heaving suppression guide member 4, the guided roller R1 abuts against the lower guide 422 of the heaving suppression guide member 4. At this time, the resistance for conveying the pallet 2 is decreased by rolling the guided roller R1 in contact with the heaving suppression guide member 4. As described above, the guided rollers R1 of the pallet 2 are arranged at two portions (that is, supported at two points) at an interval in the conveyance direction. Compared to arranging one guided roller R1 (one-point support), vertical backlashes of the pallet 2 at the leading and trailing ends can be suppressed.

When the workpiece W is always mounted on the pallet 2 in the conveying apparatus 1, or when the center of gravity of the pallet 2 exists on the right side (outward) in FIG. 3 with respect to the conveyor 3 even in a state in which the workpiece W is not mounted, the lower guide 422 becomes unnecessary.

<Structure of Horizontal Guiderail>

The horizontal guiderail 5 extends along the conveyor 3 between the conveyor 3 and the heaving suppression guide member 4. The two side surfaces of the horizontal guiderail 5 are pinched by a pair of horizontal guided rollers R2 arranged on the lower surface of the pallet 2.

This structure regulates rotation (meandering in the conveyance direction) of the pallet 2 on the horizontal plane, improving straight running stability. Since two pairs of horizontal guided rollers R2 are arranged back and forth in the conveyance direction, straight running stability further improves. The resistance for conveying the pallet 2 is decreased by rolling the horizontal guided rollers R2 in contact with the horizontal guiderail 5. In the embodiment, the horizontal guiderail 5 is arranged in the conveying apparatus 1, and the horizontal guided rollers R2 are arranged in the pallet 2. Alternatively, two lines of horizontal guided rollers R2 may be arrayed in the conveying apparatus 1, and a straight projection may be formed on the bottom surface of the pallet 2 in the conveyance direction. In this structure, the two lines of horizontal guided rollers of the conveying apparatus 1 pinch the projection of the pallet 2.

<Example of Operation>

In the conveying apparatus 1 having the above-described structure, the roller conveyor 3 of one line supports the pallet 2 from below. The center of gravity G of the conveyance member formed from the pallet 2 and workpiece W does not exist on the conveyor 3. Thus, a fall and drop of the pallet 2 and workpiece W are prevented by making the pallet 2 abut against the heaving suppression guide member 4 on a side opposite to the center of gravity G with respect to the conveyor 3. The workpiece W (support member 22) is supported on only one side; that is, cantilevered and supported. The embodiment provides a conveying apparatus capable of cantilever support with a simple structure. Even when the size or weight of the workpiece W (or pallet 2) changes, the conveying apparatus 1 according to the embodiment need not greatly change the equipment. It suffices to simply change the distance between the heaving suppression guide member 4 and the roller conveyor 3, or change the motor M of the roller conveyor 3.

Second Embodiment

Pallet Stopping Method

A method of stopping a pallet 2 will be explained. First and second sensors (reflection sensors: not shown) are arranged near a heaving suppression guide member 4. A dog (not shown) is arranged on the pallet 2. When the first sensor detects the pallet 2 (workpiece W), the pallet 2 starts decelerating, and when the second sensor detects the dog, stops. The pallet 2 is stopped by motor control in the embodiment, but may be stopped using a stopper.

Third Embodiment

Variations of Pallet Structure

FIGS. 4A and 4B, FIGS. 5A and 5B, and FIGS. 6A and 6B are views each showing a pallet according to the third embodiment of the present invention. In the embodiment, variations of a pallet 2 are conceivable. Examples will be explained by referring to the drawings. Similar to the above-described pallet, the following pallet is also formed from a main body member 21, and a support member 22 which is arranged on the left side in the conveyance direction (right side in each drawing) and supports a workpiece W.

Figure 4A:
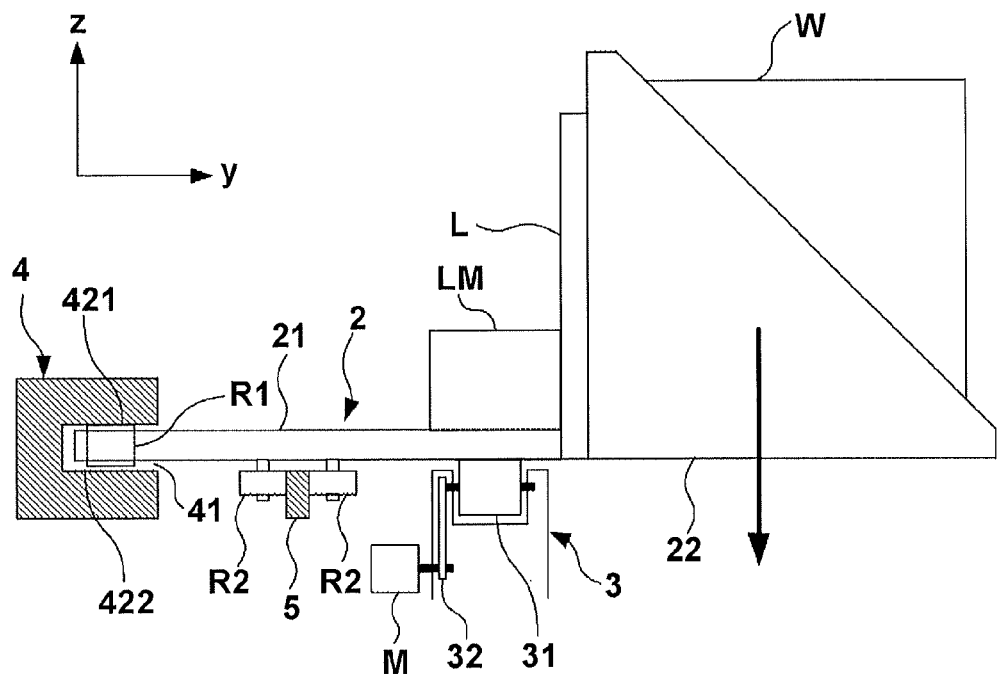
FIG. 4A is a view showing a pallet according to the third embodiment of the present invention.
Figure 4B:
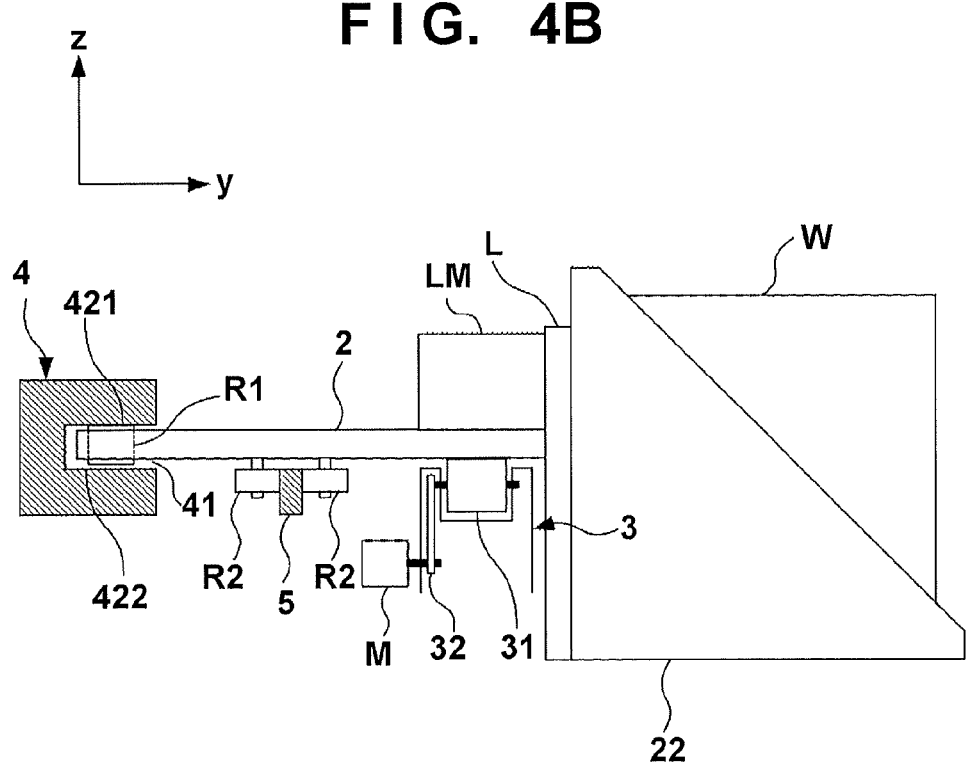
FIG. 4B is a view showing a state in which a workpiece supported by the pallet in FIG. 4A is moved down.

In the pallet 2 of FIGS. 4A and 4B, the support member 22 is arranged on the left side in the conveyance direction (right side in FIGS. 4A and 4B) with respect to the main body member 21. The support member 22 (workpiece W) can be vertically moved by a lift L. The workman moves up and down the workpiece W to a position where he can easily work, and adjusts the position to facilitate work on the upper surface of the workpiece W.

Various mechanisms are known, and an example is a rack and pinion system. Two lines of vertical racks (lifts L) are arranged on the support member 22. One rack is meshed with a first gear attached to the shaft of a motor LM arranged on the main body member 21, and the other rack is meshed with the second gear (counter gear) which meshes with the first gear. A method of vertically driving the workpiece W is arbitrary. For example, the workpiece W is driven by manually turning a handle, instead of a hydraulic piston or the lift motor LM.

Figure 5A:
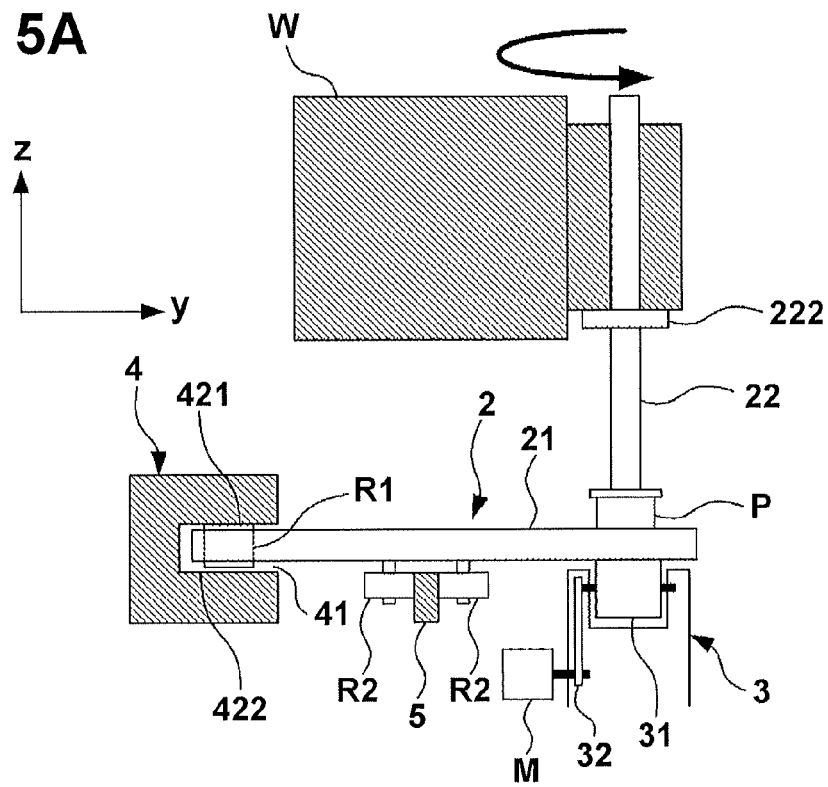
FIG. 5A is a view showing a pallet according to the third embodiment of the present invention.
Figure 5B:
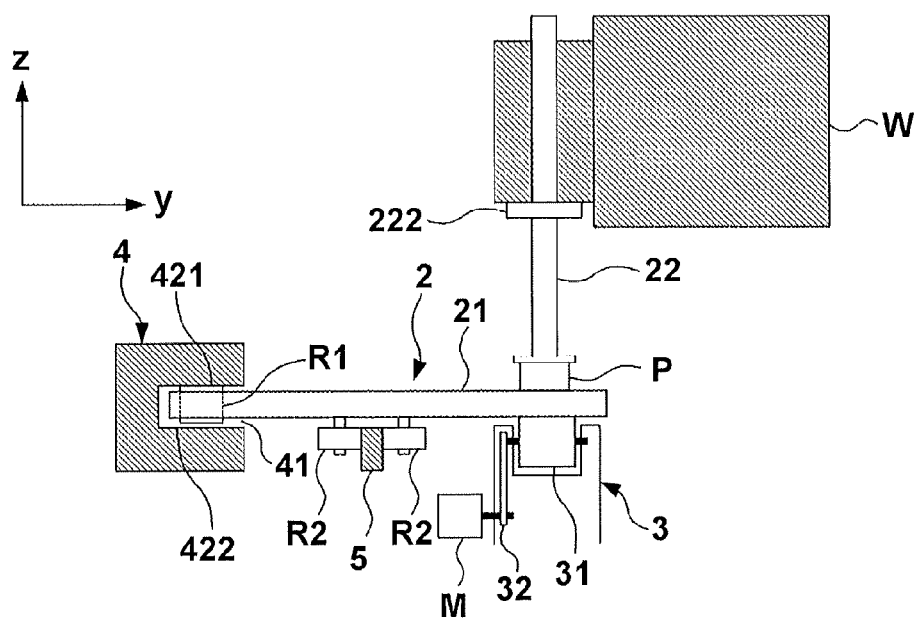
FIG. 5B is a view showing a state in which a workpiece supported by the pallet in FIG. 5A is rotated.

In the example of FIGS. 5A and 5B, the support member 22 includes a rotation mechanism P which supports the support member 22 rotatably with respect to the main body member 21 having an axis in the vertical direction (z direction). By rotating the support member 22, the workman can easily work on the leading and trailing surfaces of the workpiece W in the conveyance direction and its two, right and left side surfaces.

As an example of the detailed structure, the rotation mechanism P including a motor having an axis in the vertical direction is arranged on the left side in the conveyance direction (right side in FIGS. 5A and 5B) on the main body member 21. The support member 22 is attached so that the motor becomes coaxial with the rod-like support member 22. A disk-like stopper 222 is attached midway along the support member 22 coaxially with the support member 22. The workpiece W has a hole into which the support member 22 is inserted. By inserting the support member 22 into the hole of the workpiece W, the workpiece W is mounted on the stopper 222 and positioned in the z direction. Further, the support member 22 (or stopper 222) has a projection (key). The key engages with a recess (key groove) formed in the hole of the workpiece W to prevent rotation of the workpiece W with respect to the support member 22. More specifically, the workpiece W rotates following the support member 22 driven by the motor. In this case, formation of the recess and projection may be interchanged between the support member 22 and the workpiece W.

In addition to the above-described embodiment, for example, a turntable having an attaching hole may be arranged on the main body member 21 to insert the support member 22 into the turntable. The driving method is not limited to the motor, and the workman may directly rotate the workpiece W.

Figure 6A:
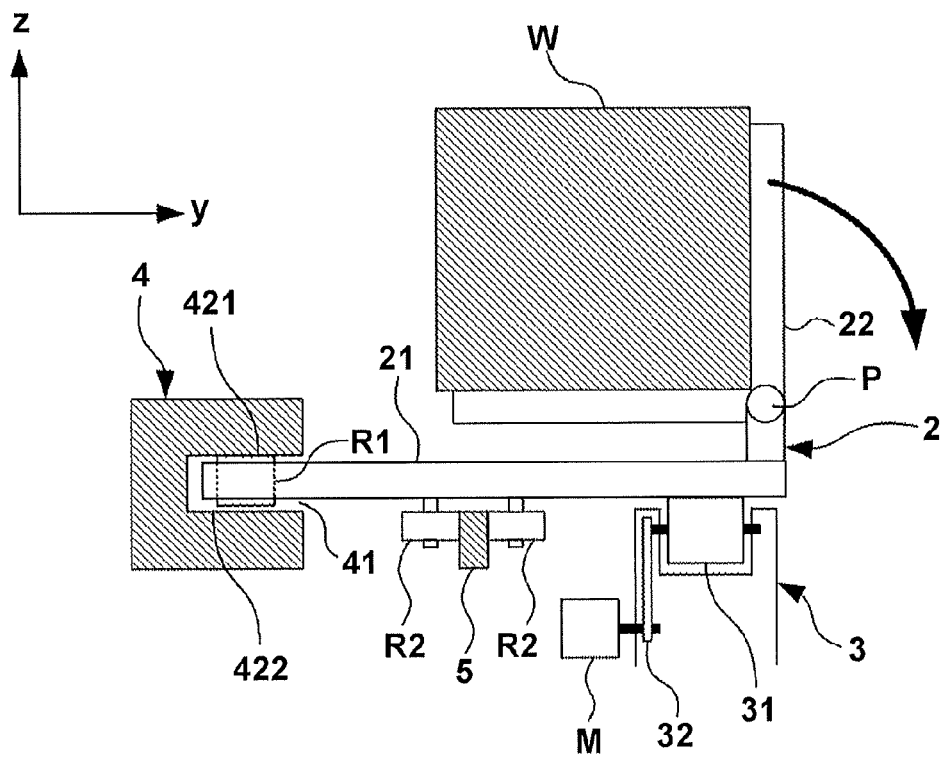
FIG. 6A is a view showing a pallet according to the third embodiment of the present invention.
Figure 6B:
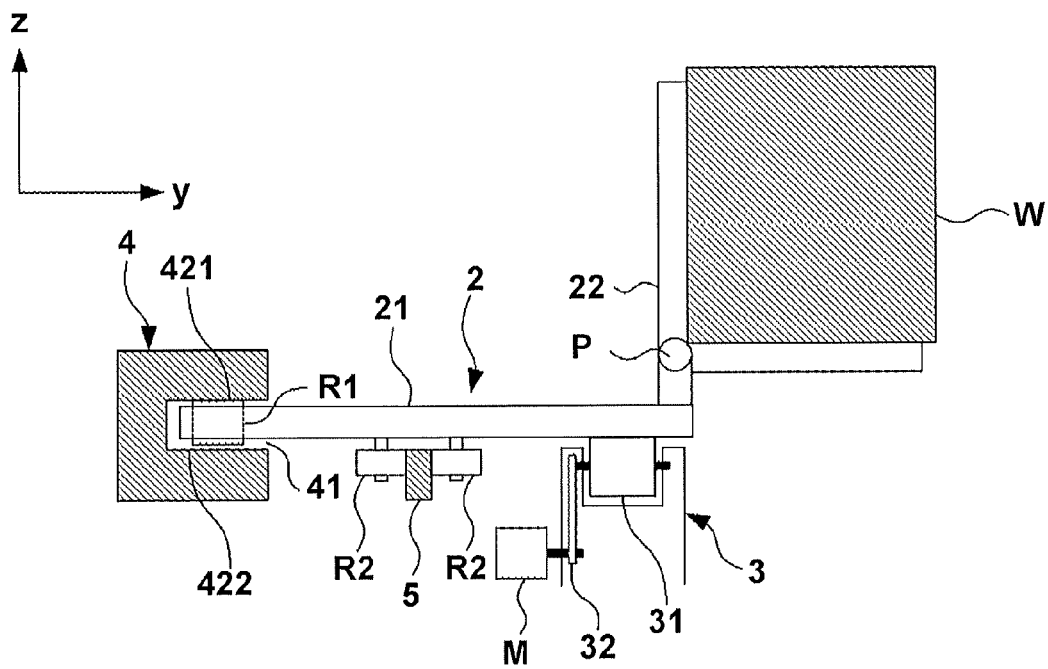
FIG. 6B is a view showing a state in which a workpiece supported by the pallet in FIG. 6A is rotated.

In the example of FIGS. 6A and 6B, the support member 22 is rotatable with respect to the main body member 21 having an axis in the conveyance direction (x direction). By rotating the support member 22, the workman can easily work on leading and trailing surfaces in the conveyance direction. Further, by the rotation, the upper surface in FIG. 6A faces the workman, as shown in FIG. 6B, improving workability even for this surface.

More specifically, a rotation mechanism (pivoting mechanism) P including a motor having an axis in the conveyance direction is arranged on the left side in the conveyance direction (right side in FIGS. 6A and 6B) on the main body member 21. The support member 22 is fixed so that the support member 22 becomes coaxial with the motor. In the example of FIGS. 6A and 6B, the support member 22 is configured by joining two plates to be perpendicular to each other (to form an L-shaped section). The support member 22 supports the workpiece W from below even before and after (FIGS. 6A and 6B) rotation (pivoting). Note that the support member 22 is not limited to this shape as long as the workpiece W can be fixed to the support member 22 in any state. For example, the workpiece W may be fixed to the support member 22 by fastening. The driving method is not limited to the motor, and the workman may directly rotate the workpiece W.

Fourth Embodiment

Figure 7:
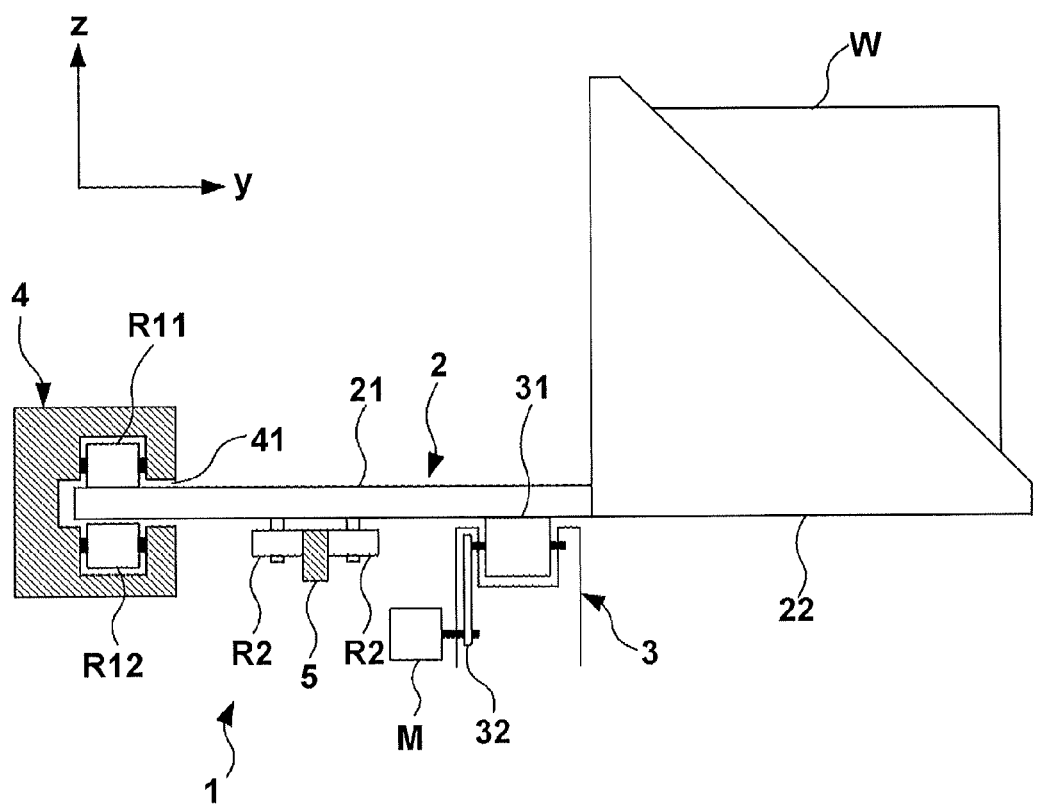
FIG. 7 is a view for explaining a conveying apparatus according to the fourth embodiment of the present invention when viewed in the conveyance direction.

FIG. 7 is a view showing a conveying apparatus 1 according to the fourth embodiment of the present invention when viewed from the downstream side in the conveyance direction. The fourth embodiment is different from the first embodiment in that a pallet 2 does not include guided rollers R1 and a heaving suppression guide member 4 includes upper rollers R11 and lower rollers R12. In this structure, the plurality of rollers R11 and the plurality of rollers R12 are arranged at equal intervals in the conveyance direction, and the interval is shorter than ½ of the length of the pallet 2 in the conveyance direction. Hence, the upper and lower surfaces of the pallet 2 contact at least two rollers R11 and two rollers R12, respectively, suppressing a backlash in the x direction.

In the embodiment, the upper rollers R11 or lower rollers R12 roll in contact with the pallet 2, decreasing the resistance when conveying the pallet 2. The pallet 2 does not require a roller which contacts the heaving suppression guide member 4, and the structure of the pallet 2 can be simplified.

In the fourth embodiment, the same variations (FIGS. 4A and 4B, FIGS. 5A and 5B, and FIGS. 6A and 6B) as those in the third embodiment are applicable to the pallet 2 in terms of the method of supporting the workpiece W.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-176311, filed Aug. 11, 2011, which is hereby incorporated by reference herein in its entirety.

What is claimed is:

1. A conveying apparatus which conveys a workpiece, said apparatus comprising:
   a pallet which supports the workpiece;
   a conveyor which comprises a plurality of driven rollers arranged in a line; and
   a guide member which extends along the line of the driven rollers on a first side of the line of the driven rollers, wherein said pallet includes:

a main portion which has a plate shape and is placed on the driven rollers; and a support portion which supports the workpiece, wherein said main portion includes:

a first end at the first side; and a second end at a second side, opposed to the first side, of the line of the driven rollers, wherein said support portion is provided at the second end, wherein the guide member faces upper, lower and end surfaces of the first end, and wherein said pallet is supported by said driven rollers and said guide member such that the workpiece on the support portion is supported in a cantilevered arrangement.

2. The apparatus according to claim 1, wherein said guide member includes a groove into which the first end of said pallet is horizontally inserted, and wherein an inner wall of said groove faces the upper, lower and end surfaces of the first end.

3. The apparatus according to claim 1, wherein:

said pallet includes a guided roller on the first end; and said guide member includes at least one guide which abuts against said guided roller.

4. The apparatus according to claim 1, further comprising a horizontal guiderail which extends along the line of the rollers between said conveyor and said guide member, wherein said pallet includes, on a lower surface of said pallet, a pair of horizontal guided rollers which pinch said horizontal guiderail from two side surfaces of said horizontal guiderail.

5. The apparatus according to claim 1, wherein said guide member includes an upper roller and lower roller which abut against an upper surface and lower surface of the pallet on the first end of said main portion.

6. The apparatus according to claim 1, wherein said pallet includes a rotation mechanism, wherein said support portion is connected to said main portion through the rotation mechanism, and wherein said rotation mechanism supports said support member with the ability to rotate with respect to said main body member.

7. The apparatus according to claim 6, wherein said rotation mechanism supports said support member with the ability to rotate about an axis parallel to the line of driven rollers.

8. A conveying apparatus which conveys a workpiece, said apparatus comprising:

a pallet which supports the workpiece;

a conveyor which comprises a plurality of driven rollers arranged in a line; and a guide member which extends along the line of the driven rollers on a first side of the line of the driven rollers, wherein said pallet includes:

a main portion which has a plate shape and is placed on the driven rollers; and a support portion which supports the workpiece, wherein said main portion includes:

a first end at the first side; and a second end at a second side, opposed to the first side, of the line of the driven rollers, wherein said support portion is provided at the second end, wherein the guide member faces upper, lower and end surfaces of the first end, wherein said pallet includes a rotation mechanism, wherein said support portion is connected to said main portion through the rotation mechanism, and wherein said rotation mechanism supports said support member with the ability to rotate with respect to said main body member about an axis parallel to the line of driven rollers.

* * * * *